United States Patent
Tsunemori et al.

(10) Patent No.: US 10,494,522 B2
(45) Date of Patent: Dec. 3, 2019

(54) POLYCARBONATE RESIN HAVING AMINE RESISTANCE

(71) Applicant: TEIJIN LIMITED, Osaka (JP)

(72) Inventors: Hideyuki Tsunemori, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 77 days.

(21) Appl. No.: 15/770,898

(22) PCT Filed: Oct. 24, 2016

(86) PCT No.: PCT/JP2016/081421
§ 371 (c)(1),
(2) Date: Apr. 25, 2018

(87) PCT Pub. No.: WO2017/073508
PCT Pub. Date: May 4, 2017

(65) Prior Publication Data
US 2018/0312688 A1 Nov. 1, 2018

(30) Foreign Application Priority Data

Oct. 29, 2015 (JP) ................................. 2015-212987

(51) Int. Cl.
*C08K 5/02* (2006.01)
*C08L 69/00* (2006.01)
*C08G 64/04* (2006.01)

(52) U.S. Cl.
CPC .............. *C08L 69/00* (2013.01); *C08G 64/04* (2013.01)

(58) Field of Classification Search
USPC .................................................. 528/196, 198
See application file for complete search history.

(56) References Cited

U.S. PATENT DOCUMENTS

2015/0299388 A1 10/2015 Hur et al.

FOREIGN PATENT DOCUMENTS

| EP | 2 740 598 | 6/2014 |
|---|---|---|
| JP | 64-69625 | 3/1989 |
| JP | 7-268199 | 10/1995 |
| JP | 8-34846 | 2/1996 |

(Continued)

OTHER PUBLICATIONS

Supplementary European Search Report dated Sep. 24, 2018 in European Application No. 16859738.3.

(Continued)

*Primary Examiner* — Terressa Boykin
(74) *Attorney, Agent, or Firm* — Wenderoth, Lind & Ponack, L.L.P.

(57) ABSTRACT

A polycarbonate copolymer or copolymerized polycarbonate blend having excellent amine resistance, which has, as main constituent units, (A) constituent units each represented by the following formula (1):

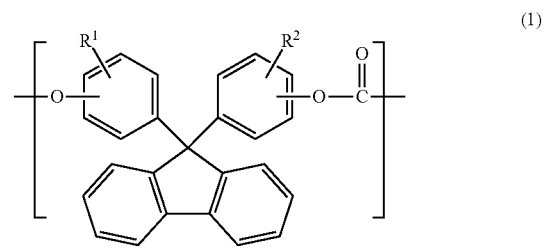

(1)

wherein, in the formula (1), each of $R^1$ and $R^2$ is independently a hydrogen atom, a hydrocarbon group having 1 to 9 carbon atoms and optionally containing an aromatic group, or a halogen atom, (B) constituent units each represented by the following formula (2):

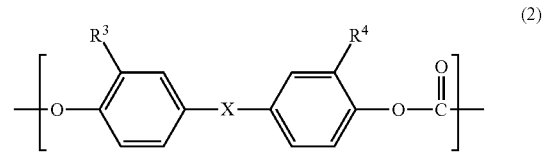

(2)

wherein, in the formula (2), each of $R^3$ and $R^4$ is independently an alkyl group having 1 to 6 carbon atoms or a halogen atom, and X is a single bond, a substituted or unsubstituted alkylene group, a substituted or unsubstituted alkylidene group, a sulfur atom, or an oxygen atom, and (C) constituent units each represented by the following formula (3):

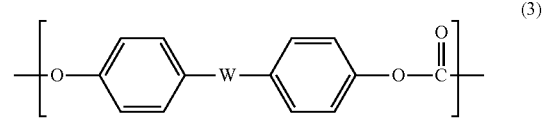

(3)

wherein, in the formula (3), W represents a single bond, a substituted or unsubstituted alkylene group, a substituted or unsubstituted alkylidene group, a sulfur atom, or an oxygen atom, wherein the amount of the constituent units (A) is 5 to 15 mol %, the amount of the constituent units (B) is 20 to 60 mol %, and the amount of the constituent units (C) is 25 to 75 mol %, based on the mole of the all constituent units, and the polycarbonate copolymer or (Continued)

copolymerized polycarbonate blend is excellent in scratch resistance, impact resistance, heat resistance, and amine resistance.

12 Claims, No Drawings

(56) References Cited

FOREIGN PATENT DOCUMENTS

| | | |
|---|---|---|
| JP | 8-183852 | 7/1996 |
| JP | 2002-117580 | 4/2002 |
| JP | 2002-221622 | 8/2002 |
| JP | 3768903 | 4/2006 |
| JP | 2010-256621 | 11/2010 |
| JP | 2012-224759 | 11/2012 |
| JP | 5173803 | 4/2013 |
| KR | 2014-0002230 | 1/2014 |

OTHER PUBLICATIONS

International Search Report dated Jan. 17, 2017 in International (PCT) Application No. PCT/JP2016/081421.

POLYCARBONATE RESIN HAVING AMINE RESISTANCE

TECHNICAL FIELD

The present invention relates to a polycarbonate resin which can suppress polymer decomposition under conditions of being exposed to a basic environment containing an amine. In addition, the invention relates to a polycarbonate resin molded article (such as a sheet or a film) having excellent amine resistance, which is advantageously used in producing an interior automotive trim part. Further, the invention relates to an interior automotive trim part which is formed from a polycarbonate resin having specific constituent units, and which is excellent in scratch resistance, impact resistance, heat resistance, and amine resistance.

BACKGROUND ART

A polyurethane foam is produced from polyol and polyisocyanate as main raw materials, and obtained by mixing a foaming agent, a foam stabilizer, a catalyst, a colorant, and the like with polyurethane and resinifying the resultant mixture while foaming it, and is widely used particularly in the field of automobile as a seat cushioning, a door trim, a headrest, an armrest, a steering wheel, a sound absorbing or vibration damping material for bottom, top and the like, a cushioning material, a sun visor, and the like. A tertiary amine compound used as a catalyst is an indispensable substance in the resinification for a polyurethane foam and the reaction of foaming or expansion, but the amine catalyst has been known to slowly volatilize from the polyurethane foam after produced to cause other interior parts to suffer discoloration or whitening.

Further, in the field of automobile, in an attempt to reduce the burden on the environment and improve the production efficiency, studies are made on interior trim parts having no coating (coating-less), and a coating-less material which does not require a coating treatment intended for surface protection is desired. Therefore, such a coating-less material needs an amine resistance.

A polycarbonate resin has excellent transparency, impact resistance, heat resistance, and dimensional stability, and therefore is used as engineering plastics in a wide variety of fields, such as housing for electric or electronic device, interior or exterior automotive trim parts, building materials, furniture, instruments, and miscellaneous goods. Further, the polycarbonate resin has a low specific gravity, as compared to inorganic glass, and can be reduced in weight, and has excellent productivity, and therefore is used in the application of window for automobile and the like.

Further, a sheet or film using a polycarbonate resin is subjected to additional fabrication, such as a coating treatment, a laminate, or surface decoration, and the resultant material is widely used as various types of display devices and protective parts for interior automotive trims.

However, a polycarbonate resin which has not been subjected to coating treatment has a problem in that, when exposed to a basic environment containing an amine, the polymer is decomposed, so that the surface of a molded article obtained from the resin suffers whitening, leading to poor appearance. Further, such a polycarbonate resin has a pencil hardness as low as 2B, as measured in accordance with Testing methods for paints—Part 5: Mechanical property of film—Section 4: Scratch hardness (Pencil method), which is descried in JIS K5600-5-4, and has a problem in that when used as a coating-less material, the surface of the material is likely to be scratched.

For solving the problems, the use of a copolymerized polycarbonate resin having a high surface hardness (for example, PTL 1) has been known. This copolymerized polycarbonate resin has a high surface hardness and excellent resistance to ammonia; however, it has a problem of poor impact resistance.

Further, there is a description of a method for obtaining a polycarbonate or copolycarbonate having 2,2-bis(4-hydroxy-3-methylphenyl)propane as constituent units (for example, PTL's 2 to 6). This polycarbonate resin has an improved surface hardness, but has a problem in that it has poor heat resistance, as compared to other polycarbonate resins.

Thus, there has not yet been present a polycarbonate resin which is excellent in scratch resistance, impact resistance, heat resistance, and amine resistance.

CITATION LIST

Patent Literature

PTL 1: Japanese Patent No. 5173803

PTL 2: JP-A-64-069625

PTL 3: JP-A-08-183852

PTL 4: JP-A-08-034846

PTL 5: JP-A-2002-117580

PTL 6: Japanese Patent No. 3768903

DISCLOSURE OF INVENTION

Technical Problem

An object of the present invention is to provide a polycarbonate resin which is excellent in scratch resistance, impact resistance, heat resistance, and amine resistance. Another object of the invention is to provide a polycarbonate resin molded article which is especially advantageously used as an interior automotive trim part.

Solution to Problem

The present inventors have unexpectedly found that, even when using a polycarbonate resin, the above-mentioned object can be achieved by using the polycarbonate resin containing specific structural units. Based on the above findings, further studies have been made, and, as a result, the present invention has been completed.

Specifically, in the present invention, there are provided the following (Construction 1) to (Construction 12)

(Construction 1)

A polycarbonate copolymer or copolymerized polycarbonate blend having excellent amine resistance, which comprises, as main constituent units, (A) constituent units each represented by the following formula (1):

[Chem. 1]

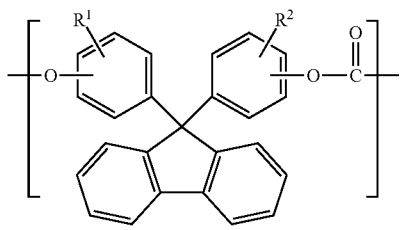

(1)

wherein, in the formula (1), each of $R^1$ and $R^2$ is independently a hydrogen atom, a hydrocarbon group having 1 to 9 carbon atoms and optionally containing an aromatic group, or a halogen atom, (B) constituent units each represented by the following formula (2):

[Chem. 2]

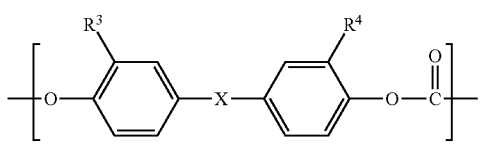

(2)

wherein, in the formula (2), each of $R^3$ and $R^4$ is independently an alkyl group having 1 to 6 carbon atoms or a halogen atom, and X is a single bond, a substituted or unsubstituted alkylene group, a substituted or unsubstituted alkylidene group, a sulfur atom, or an oxygen atom, and (C) constituent units each represented by the following formula (3):

[Chem. 3]

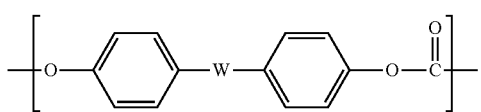

(3)

wherein, in the formula (3), W represents a single bond, a substituted or unsubstituted alkylene group, a substituted or unsubstituted alkylidene group, a sulfur atom, or an oxygen atom, wherein the amount of the constituent units (A) is 5 to 15 mol %, the amount of the constituent units (B) is 20 to 60 mol %, and the amount of the constituent units (C) is 25 to 75 mol %, based on the mole of the all constituent units.

(Construction 2)

The polycarbonate copolymer or copolymerized polycarbonate blend having excellent amine resistance according to item 1 above, wherein each of $R^1$ and $R^2$ in the formula (1) is independently a hydrogen atom or an alkyl group having 1 to 6 carbon atoms, and, in the formula (2), each of $R^3$ and $R^4$ is independently an alkyl group having 1 to 6 carbon atoms, and X is a single bond, a substituted or unsubstituted alkylene group having 1 to 10 carbon atoms, or a substituted or unsubstituted alkylidene group having 1 to 10 carbon atoms, and W in the formula (3) is a single bond, a substituted or unsubstituted alkylene group having 1 to 10 carbon atoms, or a substituted or unsubstituted alkylidene group having 1 to 10 carbon atoms.

(Construction 3)

The polycarbonate copolymer or copolymerized polycarbonate blend according to item 1 or 2 above, which has a glass transition temperature of 140 to 160° C.

(Construction 4)

The polycarbonate copolymer or copolymerized polycarbonate blend according to any one of items 1 to 3 above, which has a Rockwell hardness of 95 to 120, as measured by means of a Rockwell hardness tester (M scale) in accordance with JIS K7202-2.

(Construction 5)

The polycarbonate copolymer or copolymerized polycarbonate blend according to any one of items 1 to 4 above, which has a striking energy of 25 J or more, as measured by a high-velocity surface impact test in accordance with JIS K7211-2, wherein the fracture type is a ductile fracture.

(Construction 6)

The polycarbonate copolymer or copolymerized polycarbonate blend according to any one of items 1 to 5 above, which has a viscosity average molecular weight of 15,000 to 40,000.

(Construction 7)

The polycarbonate copolymer or copolymerized polycarbonate blend according to any one of items 1 to 6 above, wherein the constituent units (A) are constituent units derived from 9,9-bis(4-hydroxy-3-methylphenyl)fluorene.

(Construction 8)

The polycarbonate copolymer or copolymerized polycarbonate blend according to any one of items 1 to 7 above, wherein the constituent units (B) are constituent units derived from 2,2-bis(4-hydroxy-3-methylphenyl)propane.

(Construction 9)

The polycarbonate copolymer or copolymerized polycarbonate blend according to any one of items 1 to 8 above, wherein the constituent units (C) are constituent units derived from 2,2-bis(4-hydroxyphenyl)propane.

(Construction 10)

A molded article which is obtained by subjecting the polycarbonate copolymer or copolymerized polycarbonate blend according to any one of items 1 to 9 above to injection molding.

(Construction 11)

A sheet or film which is obtained by subjecting the polycarbonate copolymer or copolymerized polycarbonate blend according to any one of items 1 to 9 above to extrusion.

(Construction 12)

An interior automotive trim part using the molded article of item 10 above or the sheet or film of item 11 above.

Advantageous Effects of Invention

The polycarbonate resin of the present invention and a molded article obtained from the resin are excellent in amine resistance, scratch resistance, heat resistance, and impact resistance, and therefore advantageously used in an interior automotive trim part. Thus, the industrial effects obtained from the invention are remarkable.

DESCRIPTION OF EMBODIMENTS

Hereinbelow, details of the present invention will be described.

<Polycarbonate Resin>

The polycarbonate resin of the invention (including a polycarbonate copolymer and a copolymerized polycarbonate blend) comprises, as main constituent units, (A) constituent units each represented by the following formula (1):

[Chem. 4]

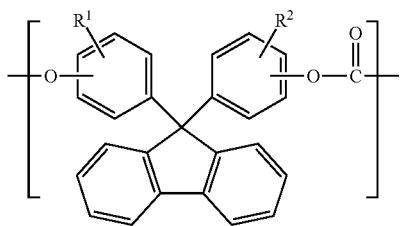

(1)

wherein, in the formula (1), each of $R^1$ and $R^2$ is independently a hydrogen atom, a hydrocarbon group having 1 to 9 carbon atoms and optionally containing an aromatic group, or a halogen atom, (B) constituent units each represented by the following formula (2):

[Chem. 5]

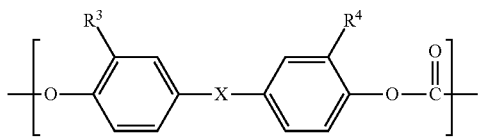

(2)

wherein, in the formula (2), each of $R^3$ and $R^4$ is independently an alkyl group having 1 to 6 carbon atoms or a halogen atom, and X is a single bond, a substituted or unsubstituted alkylene group, a substituted or unsubstituted alkylidene group, a sulfur atom, or an oxygen atom, and (C) constituent units each represented by the following formula (3):

[Chem. 6]

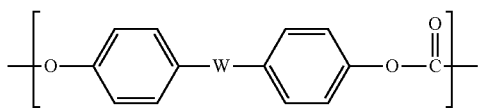

(3)

wherein, in the formula (3), W represents a single bond, a substituted or unsubstituted alkylene group, a substituted or unsubstituted alkylidene group, a sulfur atom, or an oxygen atom.

In the invention, the term "main" means an amount of 70 mol % or more, preferably 80 mol % or more, more preferably 90 mol % or more, further preferably 95 mol % or more, most preferably 100 mol %, based on the mole of the all carbonate constituent units except the ends (100 mol %).

In the constituent units (A) represented by the formula (1) above, each of $R^1$ and $R^2$ is independently preferably a hydrogen atom or an alkyl group having 1 to 6 carbon atoms, more preferably a hydrogen atom or an alkyl group having 1 to 3 carbon atoms.

Examples of dihydric phenols from which the constituent units (A) are derived include 9,9-bis(4-hydroxyphenyl)fluorene and 9,9-bis(4-hydroxy-3-methylphenyl)fluorene. The most preferred dihydric phenol is 9,9-bis(4-hydroxy-3-methylphenyl)fluorene.

In the polycarbonate resin of the invention, the amount of the constituent units (A) is 5 to 15 mol %, based on the mole of the all constituent units. When the amount of the constituent units (A) is more than 15 mol %, the heat resistance is improved, but the impact resistance is disadvantageously poor. When the amount of the constituent units (A) is less than 5 mol %, the heat resistance is disadvantageously poor.

In the constituent units (B) represented by the formula (2) above, each of $R^3$ and $R^4$ is independently preferably an alkyl group having 1 to 6 carbon atoms, more preferably an alkyl group having 1 to 4 carbon atoms. X is preferably a single bond, a substituted or unsubstituted alkylene group having 1 to 10 carbon atoms, or a substituted or unsubstituted alkylidene group having 1 to 10 carbon atoms, more preferably a substituted or unsubstituted alkylene group having 1 to 5 carbon atoms, or a substituted or unsubstituted alkylidene group having 1 to 5 carbon atoms.

Examples of dihydric phenols from which the constituent units (B) are derived include 2,2-bis(4-hydroxy-3-methylphenyl)propane (hereinafter, referred to as "bisphenol C"), 2,2-bis(4-hydroxy-3-isopropylphenyl)propane, and 2,2-bis(3-t-butyl-4-hydroxyphenyl)propane. The most preferred dihydric phenol is bisphenol C.

In the polycarbonate resin of the invention, the amount of the constituent units (B), based on the mole of the all constituent units, is 20 to 60 mol %, preferably 25 to 55 mol %, more preferably 30 to 50 mol %. When the amount of the constituent units (B) is more than 60 mol %, the impact resistance and heat resistance are disadvantageously poor. When the amount of the constituent units (B) is less than 20 mol %, the amine resistance is disadvantageously poor.

In the constituent units (C) represented by the formula (3) above, W is preferably a single bond, a substituted or unsubstituted alkylene group having 1 to 10 carbon atoms, or a substituted or unsubstituted alkylidene group having 1 to 10 carbon atoms, more preferably a single bond, a substituted or unsubstituted alkylene group having 1 to 5 carbon atoms, or a substituted or unsubstituted alkylidene group having 1 to 5 carbon atoms.

Examples of dihydric phenols from which the constituent units (C) are derived include 2,2-bis(4-hydroxyphenyl)propane (hereinafter, referred to as "bisphenol A"), 4,4'-dihydroxy-1,1-biphenyl, 4,4'-dihydroxydiphenyl ether, 4,4'-dihydroxydiphenyl thioether, 4,4'-dihydroxydiphenyl sulfone, 4,4'-dihydroxydiphenyl sulfoxide, 4,4'-dihydroxydiphenyl sulfide, 1,1-bis(4-hydroxyphenyl)methane, 1,1-bis(4-hydroxyphenyl)ethane, 2,2-bis(4-hydroxyphenyl)butane, 2,2-bis(4-hydroxyphenyl)pentane, 4,4-bis(4-hydroxyphenyl)heptane, 2,2-bis(4-hydroxyphenyl)octane, and 1,1-bis(4-hydroxyphenyl) decane. The most preferred dihydric phenol is bisphenol A.

In the polycarbonate resin of the invention, the amount of the constituent units (C), based on the mole of the all constituent units, is 25 to 75 mol %, preferably 30 to 70 mol %, more preferably 35 to 65 mol %, further preferably 40 to 60 mol %. When the amount of the constituent units (C) is more than 75 mol %, the scratch resistance and amine resistance are disadvantageously poor. When the amount of the constituent units (C) is less than 25 mol %, the impact resistance is disadvantageously poor.

Further, preferred examples of dihydric phenols from which constituent units other than the constituent units (A), (B), and (C) are derived include 2,6-dihydroxynaphthalene, hydroquinone, resorcinol, resorcinol substituted with an alkyl group having 1 to 3 carbon atoms, 3-(4-hydroxyphenyl)-1,1,3-trimethylindan-5-ol, 1-(4-hydroxyphenyl)-1,3,3-trimethylindan-5-ol, 6,6'-dihydroxy-3,3,3',3'-tetramethylspiroindan, 1-methyl-1,3-bis(4-hydroxyphenyl)-3-isopropylcyclohexane, 1-methyl-2-(4-hydroxyphenyl)-3-[1-(4-hydroxyphenyl)isoprop yl]cyclohexane, and 1,6-bis(4-hydroxyphenyl)-1,6-hexanedione. Further details of the polycarbonate are described in, for example, WO 03/080728 pamphlet, JP-A-6-172508, JP-A-8-27370, JP-A-2001-55435, JP-A-2002-117580, and the like.

The polycarbonate resin of the invention is obtained by reacting a dihydric phenol and a carbonate precursor with each other. Examples of methods for the reaction include an interfacial polycondensation method, a melt transesterification method, a solid phase transesterification method for a carbonate prepolymer, and a ring-opening polymerization method for a cyclic carbonate compound. In the case of interfacial polycondensation, generally, a terminator of a monohydric phenol is used. The polycarbonate resin may be a branched polycarbonate obtained by polymerizing polycarbonate with a trifunctional component, and further may be a copolymerized polycarbonate obtained by copolymerizing polycarbonate with an aliphatic dicarboxylic acid or an aromatic dicarboxylic acid and a vinyl monomer.

In a reaction using, for example, phosgene as a carbonate precursor, the reaction is conducted generally in the presence of an acid-binding agent and a solvent. As an acid-binding agent, for example, an alkali metal hydroxide, such as sodium hydroxide or potassium hydroxide, or an amine compound, such as pyridine, is used. As a solvent, for example, a halogenated hydrocarbon, such as methylene chloride or chlorobenzene, is used. Further, for accelerating the reaction, for example, a catalyst, such as a tertiary amine or a quaternary ammonium salt, can be used. In this case, the reaction temperature is generally 0 to 40° C., and the reaction time is several minutes to 5 hours.

A transesterification reaction using, for example, a carbonic acid diester as a carbonate precursor is conducted by a method in which an aromatic dihydroxy component and a carbonic acid diester in a predetermined ratio in an inert gas atmosphere are heated while stirring, whereupon the formed alcohol or phenol is distilled off. The reaction temperature varies depending on the boiling point of the formed alcohol or phenol or the like, but is generally in the range of from 120 to 300° C. The pressure for the reaction is reduced in the initial stage of the reaction and the reaction is conducted under a reduced pressure while distilling off the formed alcohol or phenol, completing the reaction. Further, for accelerating the reaction, a catalyst generally used in a transesterification reaction can be used. Examples of carbonic acid diesters used in the transesterification reaction include diphenyl carbonate, dinaphthyl carbonate, bis(diphenyl) carbonate, dimethyl carbonate, diethyl carbonate, and dibutyl carbonate. Of these, especially preferred is diphenyl carbonate.

A monofunctional phenol generally used as a terminator can be used. Particularly, in the case of the reaction using phosgene as a carbonate precursor, a monofunctional phenol is generally used as a terminator for controlling the molecular weight, and the polycarbonate resin obtained by the reaction has the end capped by a group derived from the monofunctional phenol, and therefore has excellent heat stability, as compared to a polycarbonate having an end which is not capped. Specific examples of the monofunctional phenols include phenol, m-methylphenol, p-methylphenol, m-propylphenol, p-propylphenol, 1-phenylphenol, 2-phenylphenol, p-tert-butylphenol, p-cumylphenol, isooctylphenol, and p-long-chain-alkylphenol.

In the polycarbonate resin of the invention, if necessary, an aliphatic diol can be copolymerized. Examples include isosorbide:1,4:3,6-dianhydro-D-sorbitol, tricyclodecanedimethanol (TCDDM), 4,8-bis(hydroxymethyl)tricyclodecane, tetramethylcyclobutanediol (TMCBD), 2,2,4,4-tetramethylcyclobutane-1,3-diol, mixed isomers, cis/trans-1,4-cyclohexanedimethanol (CHDM), cis/trans-1,4-bis(hydroxymethyl)cyclohexane, cyclohex-1,4-ylenedimethanol, trans-1,4-cyclohexanedimethanol (tCHDM), trans-1,4-bis(hydroxymethyl)cyclohexane, cis-1,4-cyclohexanedimethanol (cCHDM), cis-1,4-bis(hydroxymethyl)cyclohexane, cis-1,2-cyclohexanedimethanol, 1,1'-bi(cyclohexyl)-4,4'-diol, spiroglycol, dicyclohexyl-4,4'-diol, 4,4'-dihydroxybicyclohexyl, and poly(ethylene glycol).

In the polycarbonate resin of the invention, if necessary, a fatty acid can be copolymerized. Examples include 1,10-dodecanedioic acid (DDDA), adipic acid, hexanedioic acid, isophthalic acid, 1,3-benzenedicarboxylic acid, terephthalic acid, 1,4-benzenedicarboxylic acid, 2,6-naphthalenedicarboxylic acid, 3-hydroxybenzoic acid (mHBA), and 4-hydroxybenzoic acid (pHBA).

The polycarbonate resin of the invention includes a polyester carbonate having copolymerized an aromatic or aliphatic (including alicyclic) difunctional carboxylic acid. The aliphatic difunctional carboxylic acid is preferably an α,ω-dicarboxylic acid. Preferred examples of aliphatic difunctional carboxylic acids include straight-chain saturated aliphatic dicarboxylic acids, such as sebacic acid (decanedioic acid), dodecanedioic acid, tetradecanedioic acid, octadecanedioic acid, and icosanedioic acid, and alicyclic dicarboxylic acids, such as cyclohexanedicarboxylic acid. These carboxylic acids may be copolymerized in such an amount range that the object of the invention can be achieved.

In the polycarbonate resin of the invention, if necessary, constituent units containing polyorganosiloxane units can be copolymerized.

In the polycarbonate resin of the invention, if necessary, constituent units containing a multifunctional aromatic compound which is tri- or more-functional can be copolymerized to form a branched polycarbonate. Preferred examples of multifunctional aromatic compounds which are tri- or more-functional and used for forming a branched polycarbonate include trisphenols, such as 4,6-dimethyl-2,4,6-tris(4-hydroxyphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol, and 4-{4-[1,1-bis(4-hydroxyphenyl)ethyl]benzene}-α,α-dimethylbenzylphenol. Of these, preferred is 1,1,1-tris(4-hydroxyphenyl)ethane. The amount of the constituent units derived from the above multifunctional aromatic compound is preferably 0.03 to 1.5 mol %, more preferably 0.1 to 1.2 mol %, especially preferably 0.2 to 1.0 mol %, based on the mole of the total of the constituent units derived from the multifunctional aromatic compound and the constituent units derived from another difunctional component (100 mol %).

The branched structural units may be either those which are derived from a multifunctional aromatic compound, or those which are such derived without using a multifunctional aromatic compound as due to a side reaction caused during the polymerization reaction by a melt transesterification method. The amount of the branched structure can be determined by making a calculation from $^1$H-NMR measurement.

The polycarbonate resin of the invention preferably has a viscosity average molecular weight (Mv) of 15,000 to 40,000, more preferably 16,000 to 30,000, further preferably 18,000 to 28,000. The polycarbonate resin having a viscosity average molecular weight of less than 15,000 is likely to be unable to achieve practically satisfactory toughness and fracture resistance. On the other hand, the polycarbonate resin having a viscosity average molecular weight of more than 40,000 requires a higher molding processing temperature, or requires a special molding method, and hence is poor in the general-purpose properties, and further is likely to be increased in melt viscosity and hence be increased in dependence on the injection speed, so that poor appearance and the like are caused to lower the yield.

With respect to the viscosity average molecular weight of the polycarbonate resin in the invention, first, a specific viscosity ($\eta_{SP}$) calculated by the below-shown formula is determined from a solution obtained by dissolving 0.7 g of the polycarbonate resin in 100 ml of methylene chloride at 20° C. using an Ostwald viscometer.

Specific viscosity$(\eta_{SP})=(t-t_0)/t_0$

[wherein to is the drop time in seconds of methylene chloride, and t is the drop time in seconds of a sample solution]

Using the determined specific viscosity ($\eta_{SP}$), a viscosity average molecular weight My is calculated from the following equation.

$\eta_{SP}/c=[\eta]+0.45\times[\eta]^2 c$ (wherein [η] is an intrinsic viscosity)

$[\eta]=1.23\times10^{-4}$ Mv$^{0.83}$ c=0.7

<Components Other than the Polycarbonate Resin>

The polycarbonate resin of the invention can contain a known functional agent, such as a release agent, a heat stabilizer, an ultraviolet light absorber, a fluidity improving agent, or an antistatic agent, in such an amount that the effects of the invention are not sacrificed.

(i) Release Agent

The polycarbonate resin of the invention may use a release agent in such an amount that the effects of the invention are not sacrificed. Examples of release agents include fatty acid esters, polyolefin waxes (such as a polyethylene wax and a 1-alkene polymer), fluorine compounds (such as a fluoro-oil, representatively a polyfluoroalkyl ether), a paraffin wax, and beeswax. Of these, from the viewpoint of easy availability, releasability, and transparency, fatty acid esters are preferred. The amount of the release agent contained is preferably 0.005 to 0.5 part by weight, more preferably 0.007 to 0.4 part by weight, further preferably 0.01 to 0.3 part by weight, relative to 100 parts by weight of the polycarbonate resin. When the amount of the release agent contained is the lower limit of the above range or more, an improvement effect for the releasability is clearly exhibited, and, when the amount is the upper limit of the above range or less, adverse effects, such as mold deposits caused upon molding, are advantageously reduced.

Among the above-mentioned release agents, a fatty acid ester used as a preferred release agent is described in more detail. The fatty acid ester is an ester of an aliphatic alcohol and an aliphatic carboxylic acid. The aliphatic alcohol may be either a monohydric alcohol or a polyhydric alcohol which is di- or more-hydric. Further, the number of carbon atoms of the alcohol is preferably in the range of from 3 to 32, more preferably in the range of from 5 to 30. Examples of the monohydric alcohols include dodecanol, tetradecanol, hexadecanol, octadecanol, eicosanol, tetracosanol, ceryl alcohol, and triacontanol. Examples of the polyhydric alcohols include pentaerythritol, dipentaerythritol, tripentaerythritol, polyglycerol (triglycerol through hexaglycerol), ditrimethylolpropane, xylitol, sorbitol, and mannitol. In the fatty acid ester, a polyhydric alcohol is more preferred.

On the other hand, the aliphatic carboxylic acid preferably has 3 to 32 carbon atoms, and particularly, an aliphatic carboxylic acid having 10 to 22 carbon atoms is preferred. Examples of the aliphatic carboxylic acids include saturated aliphatic carboxylic acids, such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid, and docosanoic acid (behenic acid), and unsaturated aliphatic carboxylic acids, such as palmitoleic acid, oleic acid, linoleic acid, linolenic acid, eicosenoic acid, eicosapentaenoic acid, and cetoleic acid. Of the above-mentioned aliphatic carboxylic acids, those having 14 to 20 carbon atoms are preferred. Especially, saturated aliphatic carboxylic acids are preferred. The aliphatic carboxylic acid is generally produced from natural fats and oils, such as animal fats and oils (e.g., tallow and lard) or vegetable fats and oils (e.g., palm oil), and therefore the aliphatic carboxylic acid is generally a mixture containing another carboxylic acid component of which the number of carbon atoms is different from that of the aliphatic carboxylic acid. Therefore, the aliphatic carboxylic acid is produced from natural fats and oils, and is in the form of a mixture containing another carboxylic acid component. The acid value of the fatty acid ester is preferably 20 or less (and can be substantially 0). However, when the fatty acid ester is of a full-ester, for improving the releasability, the fatty acid ester preferably contains a free fatty acid even in a small amount, and, in view of this, the acid value of the fatty acid ester of a full-ester is preferably in the range of from 3 to 15. Further, the iodine value of the fatty acid ester is preferably 10 or less (and can be substantially 0). These properties can be determined in accordance with the method descried in JIS K 0070.

The above-mentioned fatty acid ester may be any of a partial ester and a full-ester, but, from the viewpoint of achieving more excellent releasability and durability, a partial ester is preferred, and a glycerol monoester is especially preferred. A glycerol monoester has a monoester of glycerol and a fatty acid as a main component, and preferred examples of fatty acids include saturated fatty acids, such as stearic acid, palmitic acid, behenic acid, arachic acid, montanic acid, and lauric acid, and unsaturated fatty acids, such as oleic acid, linoleic acid, and sorbic acid, and particularly, those having a glycerol monoester of stearic acid, behenic acid, or palmitic acid as a main component are preferred. The fatty acid is synthesized from a natural fatty acid, and is in the form of a mixture as mentioned above. Even in such a case, the amount of the glycerol monoester in the fatty acid ester is preferably 60% by weight or more.

A partial ester is often poor in respect of the heat stability, as compared to a full-ester. For improving the heat stability of the partial ester, the partial ester preferably has a sodium metal content of less than 20 ppm, more preferably less than 5 ppm, further preferably less than 1 ppm. The fatty acid partial ester having a sodium metal content of less than 1 ppm can be produced by preparing a fatty acid partial ester by a general method and then refining the prepared partial ester by molecular distillation or the like.

Specifically, there is a method in which a gas component and a low boiling-point substance are removed by a spray nozzle-type deaerating apparatus, and then a polyhydric alcohol component, such as glycerol, is removed using a falling film-type distillation apparatus under conditions such that the distillation temperature is 120 to 150° C. and the degree of vacuum is 0.01 to 0.03 kPa, and further, using a centrifugal molecular distillation apparatus under conditions such that the distillation temperature is 160 to 230° C. and the degree of vacuum is 0.01 to 0.2 Torr, a high-purity fatty acid partial ester is obtained as a distillate, and sodium metal can be removed in the form of a distillation residue. By subjecting the obtained distillate to repeated molecular distillation so as to further increase the purity, a fatty acid partial ester having a further reduced sodium metal content can be obtained. Further, it is also important that the inside of the molecular distillation apparatus is satisfactorily cleaned by an appropriate method in advance, and, for example, the airtightness of the apparatus is increased to prevent the sodium metal component from mixing into the apparatus from an external environment. The fatty acid ester is available from manufacturers specialized in the production thereof (for example, from Riken Vitamin Co., Ltd.).

(ii) Phosphorus Stabilizer

In the polycarbonate resin of the invention, a phosphorus stabilizer of a certain type is preferably further incorporated mainly for the purpose of improving the heat stability of the polycarbonate resin being subjected to molding processing. Examples of the phosphorus stabilizers include phosphorous acid, phosphoric acid, hypophosphorous acid, phosphonic acid, and esters thereof. Further, the phosphorus stabilizers include tertiary phosphines.

Specific examples of phosphite compounds include triphenyl phosphite, tris(nonylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl) phosphite, tris(di-iso-propylphenyl) phosphite, tris(di-n-butylphenyl) phosphite, tris (2,4-di-tert-butylphenyl) phosphite, tris(2,6-di-tert-butylphenyl) phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl) pentaerythritol diphosphite, phenylbisphenol A pentaerythritol diphosphite, bis(nonylphenyl)pentaerythritol diphosphite, and dicyclohexylpentaerythritol diphosphite.

Further, as other phosphite compounds, one having a cyclic structure obtained by reacting the phosphite with a dihydric phenol can be used. Examples include 2,2'-methylenebis(4,6-di-tert-butylphenyl) (2,4-di-tert-but ylphenyl) phosphite, 2,2'-methylenebis(4,6-di-tert-butylphenyl) (2-tert-butyl-4-methylphenyl) phosphite, 2,2'-methylenebis (4-methyl-6-tert-butylphenyl) (2-tert-buty 1-4-methylphenyl) phosphite, and 2,2'-ethylidenebis(4-methyl-6-tert-butylphenyl) (2-tert-but yl-4-methylphenyl) phosphite.

Examples of phosphate compounds include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate, and diisopropyl phosphate, and preferred are triphenyl phosphate and trimethyl phosphate.

Examples of phosphonite compounds include tetrakis(2, 4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite, and preferred are tetrakis(di-tert-butylphenyl)-biphenylene diphosphonite and bis(di-tert-butylphenyl)-phenyl-phenyl phosphonite, and more preferred are tetrakis(2,4-di-tert-butylphenyl)-biphenylene diphosphonite and bis(2,4-di-tert-butylphenyl)-phenyl-phenyl phosphonite. The phosphonite compound and the above-mentioned phosphite compound having an aryl group substituted with 2 or more alkyl groups can be preferably used in combination.

Examples of phosphonate compounds include dimethyl benzenephosphonate, diethyl benzenephosphonate, and dipropyl benzenephosphonate.

Examples of tertiary phosphines include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine, and diphenylbenzylphosphine. An especially preferred tertiary phosphine is Lriphenylphosphine.

The above-mentioned phosphorus stabilizers can be used individually or in combination. Among the above phosphorus stabilizers, phosphite compounds or phosphonite compounds are preferred. Particularly, tris(2,4-di-tert-butylphenyl) phosphite, tetrakis(2,4-di-tert-butylphenyl)-4,4'-biphenylene diphosphonite, and bis(2,4-di-tert-butylphenyl)-phenyl-phenyl phosphonite are preferred. Further, the use of the above compound and a phosphate compound in combination is a preferred mode.

(iii) Hindered Phenol Stabilizer

In the polycarbonate resin of the invention, a hindered phenol stabilizer can be incorporated mainly for the purpose of improving the heat stability of the polycarbonate resin being subjected to molding processing and the thermal aging resistance. Examples of such hindered phenol stabilizers include α-tocopherol, butylhydroxytoluene, sinapyl alcohol, vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, diethyl 3,5-di-tert-butyl-4-hydroxybenzylphosphonate, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol)2,2'-ethyl idene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl6-(3-tert-butyl-5-methyl-2-hydroxybenzyl) phenyl] terephthalate, 3,9-bis{2-[3-(3-tert-butyl-4-hydroxy- 5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris2[3(3,5-di-tert-butyl-4-hydroxyphenyl)propionyloxy]ethyl isocyanurate, and tetrakis[methylene-3-(3',5'-di-tert-butyl-4-hydroxyphenyl)propionate]methane. All of them are easily available. The above hindered phenol antioxidants can be used individually or in combination.

The amount of the above-mentioned (ii) phosphorus stabilizer and/or (iii) hindered phenol antioxidant is, relative to 100 parts by weight of the polycarbonate resin, preferably 0.0001 to 1 part by weight, more preferably 0.001 to 0.5 part by weight, further preferably 0.005 to 0.1 part by weight. When the amount of the stabilizer is less than the above range and is too small, excellent stabilization effect is difficult to obtain, and, when the amount of the stabilizer is more than the above range and is too large, conversely, a lowering of the physical properties of the material or mold deposits upon molding are likely to occur.

In the polycarbonate resin of the invention, another antioxidant other than the above-mentioned hindered phenol antioxidants can be appropriately used. Examples of such other antioxidants include pentaerythritol tetrakis(3-mercaptopropionate), pentaerythritol tetrakis(3-laurylthiopropionate), and glycerol-3-stearyl thiopropionate. The amount of the above another antioxidant used is preferably 0.001 to 0.05 part by weight, relative to 100 parts by weight of the polycarbonate resin.

(iv) Ultraviolet Light Absorber

The polycarbonate used in the invention can contain an ultraviolet light absorber. Specific examples of benzophenone ultraviolet light absorbers include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydriderate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Specific examples of benzotriazole ultraviolet light absorbers include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotri azole, 2,2'-methylenebis[4-(1,1,3,3-tetramethylbutyl)-6-(2H-benzo triazol-2-yl)phenol], 2-(2-hydroxy-3,5-di-tert-butylphenyl)benzotriazole, 2-(2-hydroxy-3,5-di-tert-butylphenyl)-5-chlorobenzotriazol e, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolphenyl), 2,2'-p-phenylenebis(1,3-benzoxazin-4-one), 2-[2-hydroxy-3-(3,4,5,6-tetrahydrophthalimidomethyl)-5-methylphenyl]benzotriazole, and polymers having a 2-hydroxyphenyl-2H-benzotriazole skeleton, such as a copolymer of 2-(2'-hydroxy-5-methacryloxyethylphenyl)-2H-benzotriazole and a vinyl monomer copolymerizable with the monomer, and a copolymer of 2-(2'-hydroxy-5-acryloxyethylphenyl)-2H-benzotriazole and a vinyl monomer copolymerizable with the monomer.

Specific examples of hydroxyphenyltriazine ultraviolet light absorbers include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Further examples include compounds which are substantially the same as the above-exemplified compounds except that the phenyl group is changed to a 2,4-dimethylphenyl group, such as 2-(4,6-bis(2,4-dimethylphenyl)-1,3,5-triazin-2-yl)-5-hexyloxyphenol.

Specific examples of cyclic imino ester ultraviolet light absorbers include 2,2'-p-phenylenebis(3,1-benzoxazin-4-one), 2,2'-(4,4'-diphonylene)bis(3,1-benzoxazin-4-one), and 2,2'-(2,6-naphthalene)bis(3,1-benzoxazin-4-one).

Specific examples of cyanoacrylate ultraviolet light absorbers include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene.

Further, the ultraviolet light absorber may be an ultraviolet light absorber of a polymer type obtained by copolymerizing an ultraviolet light absorbing monomer having a structure of a radically polymerizable monomer compound and/or a light-stabilizing monomer having a hindered amine structure and a monomer, such as an alkyl (meth)acrylate. Preferred examples of the ultraviolet light absorbing monomers include compounds containing, in the ester substituent of a (meth)acrylate, a benzotriazole skeleton, a benzophenone skeleton, a triazine skeleton, a cyclic imino ester skeleton, or a cyanoacrylate skeleton.

Among the above-mentioned ultraviolet light absorbers, from the viewpoint of the ultraviolet light absorbing ability, benzotriazole and hydroxyphenyltriazine ultraviolet light absorbers are preferred, and, from the viewpoint of the heat resistance and color hue, cyclic imino ester and cyanoacrylate ultraviolet light absorbers are preferred. The ultraviolet light absorbers may be used individually or in combination.

The amount of the ultraviolet light absorber contained is, relative to 100 parts by weight of the polycarbonate resin, preferably 0.01 to 2 parts by weight, more preferably 0.03 to 2 parts by weight, further preferably 0.04 to 1 part by weight, especially preferably 0.05 to 0.5 part by weight.

(v) Fluidity Improving Agent

The polycarbonate resin of the invention can contain a fluidity improving agent in such an amount that the effects of the invention are not sacrificed. Preferred examples of the fluidity improving agents include styrene oligomers, polycarbonate oligomers (including those of a highly branched type, of a hyperbranched type, and of a cyclic oligomer type), polyalkylene terephthalate oligomers (including those of a highly branched type, of a hyperbranched type, and of a cyclic oligomer type), highly branched or hyperbranched aliphatic polyester oligomers, terpene resins, and polycaprolactone. The amount of the fluidity improving agent is, relative to 100 parts by weight of the polycarbonate resin, preferably 0.1 to 30 parts by weight, more preferably 1 to 20 parts by weight, further preferably 2 to 15 parts by weight. Polycaprolactone is especially preferred, and the amount of the polycaprolactone is especially preferably 2 to 7 parts by weight, relative to 100 parts by weight of the polycarbonate resin. The molecular weight of the polycaprolactone, in terms of a number average molecular weight, is 1,000 to 70,000, preferably 1,500 to 40,000, more preferably 2,000 to 30,000, further preferably 2,500 to 15,000.

(vi) Antistatic Agent

In the polycarbonate resin of the invention, an antistatic agent can be incorporated mainly for the purpose of improving the antistatic properties. As an antistatic agent, a phosphonium sulfonate, a phosphite, a caprolactone polymer, or the like can be used, and a phosphonium sulfonate is preferably used. Specific examples of the phosphonium sulfonates include tetrabutylphosphonium dodecylsulfonate, tetrabutylphosphonium dodecylbenzenesulfonate, tributyloctylphosphonium dodecylbenzenesulfonate, tetraoctylphosphonium dodecylbenzenesulfonate, tetraethylphosphonium octadecylbenzenesulfonate, tributylmethylphosphonium dibutylbenzenesulfonate, triphenylphosphonium dibutylnaphthylsulfonate, and trioctylmethylphosphonium diisopropylnaphthylsulfonate. Of these, from the viewpoint of the compatibility with a polycarbonate and easy availability, preferred is tetrabutylphosphonium dodecylbenzenesulfonate. The amount of the antistatic agent incorporated is, relative to 100 parts by weight of the polycarbonate resin, preferably 0.1 to 5.0 parts by weight, more preferably 0.2 to 3.0 parts by weight, further preferably 0.3 to 2.0 parts by weight, especially preferably 0.5 to 1.8 parts by weight. When the amount of the antistatic agent is 0.1 part by weight or more, an antistatic effect can be obtained, and, when the amount of the antistatic agent is 5.0 parts by weight or less, excellent transparency and mechanical strength are achieved, and the surface of the resultant molded article suffers no silver surface or peeling, and thus poor appearance is unlikely to be caused.

The polycarbonate resin of the invention can further contain various additives, such as a bluing agent, a fluorescent dye, a flame retardant, and a dye or pigment. These additives can be appropriately selected and contained in such an amount that the effects of the invention are not sacrificed.

The polycarbonate resin preferably contains a bluing agent in an amount of 0.05 to 3.0 ppm (parts per million by weight). Representative examples of bluing agents include Macrolex Violet B and Macrolex Blue RR of Bayer AG, and Polysynthren Blue RLS of Clariant.

Examples of fluorescent dyes (including fluorescent brighteners) include a coumarin fluorescent dye, a benzopyran fluorescent dye, a perylene fluorescent dye, an anthraquinone fluorescent dye, a thioindigo fluorescent dye, a xanthene fluorescent dye, a xanthone fluorescent dye, a thioxanthene fluorescent dye, a thioxanthone fluorescent dye, a thiazine fluorescent dye, and a diaminostilbene fluorescent dye. The amount of the fluorescent dye (including a fluorescent brightener) incorporated is preferably 0.0001 to 0.1 part by weight, relative to 100 parts by weight of the polycarbonate resin.

Examples of flame retardants include a sulfonic acid metal salt flame retardant, a halogen-containing compound flame retardant, a phosphorus-containing compound flame retardant, and a silicon-containing compound flame retardant. Of these, a sulfonic acid metal salt flame retardant is preferred. The amount of the flame retardant incorporated is generally, relative to 100 parts by weight of the polycarbonate resin, preferably in the range of from 0.01 to 1 part by weight, more preferably 0.05 to 1 part by weight.

With respect to the method for incorporating an additive into the polycarbonate resin of the invention, there is no particular limitation, and a known method can be used. As an example of the method most generally used, there can be mentioned a method in which the polycarbonate resin and an additive are premixed and then charged into an extruder and melt-kneaded, and the extruded threads are cooled and cut by means of a pelletizer to produce a molding material in a pellet form.

With respect to the extruder used in the above-mentioned method, any of a single-screw extruder and a twin-screw extruder can be used, but, from the viewpoint of the productivity and kneading properties, a twin-screw extruder is preferred. As a representative example of the twin-screw extruder, there can be mentioned ZSK (trade name; manufactured by Werner & Pfleiderer GmbH). Specific examples of twin-screw extruders of the similar type include TEX (trade name; manufactured by The Japan Steel Works, Ltd.), TEM (trade name; manufactured by Toshiba Machine Co., Ltd.), and KTX (trade name; manufactured by Kobe Steel Ltd.). With respect to the extruder, one having a vent capable of deaerating water contained in raw materials or a volatile gas generated from the melt-kneaded resin can be preferably used. A vacuum pump for efficiently discharging the generated water and volatile gas out of the extruder from the vent is preferably provided. Further, a screen for removing foreign matter or the like mixed into the extrusion raw materials can be provided in a zone ahead of the extruder dice portion to remove foreign matter from the resin composition. Examples of such screens include a woven metal wire, a screen changer, and a sintered metal plate (such as a disc filter).

Further, an additive can be independently fed to an extruder, but is preferably premixed with the resin raw material as mentioned above. Examples of such premixing means include a Nauta mixer, a twin-shell blender, a Henschel mixer, a mechanochemical apparatus, and an extrusion mixer. A more preferred method is, for example, a method in which part of the raw material resin and an additive are mixed by a high-speed agitator, such as a Henschel mixer, to prepare a masterbatch, and then the masterbatch is mixed with the remaining resin raw material by an agitator operated at a speed which is not high, such as a Nauta mixer.

The resin extruded by an extruder is subjected to pelletization in which the resin is directly cut, or strands are formed from the extruded resin and then subjected to pelletization in which the strands are cut by a pelletizer. When there is a need to reduce an influence of dust from the outside or the like, it is preferred to clean the atmosphere around the extruder. Further, in the production of the pellets, using the various methods which have been proposed in connection with a polycarbonate resin for optical disc, it is preferred to narrow the distribution of shapes of the pellets, to further reduce a miss-cut material, to further reduce a fine powder generated during the transportation, and to reduce air bubbles (vacuum bubbles) generated inside the strands or pellets. Examples of methods for reducing the miss-cut material include means, such as controlling the temperature of threads being cut by a pelletizer, blowing ion wind upon cutting, adjusting the rake of a pelletizer, and incorporating an appropriate release agent, and a method in which a mixture of the cut pellets and water is subjected to filtration to separate the pellets, water, and miss-cut material from one another. An example of the measurement method is disclosed in, for example, JP-A-2003-200421. These methods enable high-cycle molding and reduction of the rate of the occurrence of failures, such as silver surface.

The amount of the miss-cut material in the molding material (pellets) is preferably 10 ppm or less, more preferably 5 ppm or less. The miss-cut material means powder particles which are capable of passing through a JIS standard sieve having a sieve opening of 1.0 mm and finer than the pellets having a desired size. The shape of the pellets can be a general shape, such as a cylinder, a prism, or a sphere, and is more preferably a cylinder (including an elliptic cylinder), and the diameter of the cylinder is preferably 1.5 to 4 mm, more preferably 2 to 3.5 mm. In the elliptic cylinder, the ratio of the short diameter to the long diameter is preferably 60% or more, more preferably 65% or more. On the other hand, the length of the cylinder is preferably 2 to 4 mm, more preferably 2.5 to 3.5 mm.

<Properties of the Polycarbonate Resin>

The polycarbonate resin of the invention can suppress polymer decomposition in a basic environment containing an amine. Various studies have been made, and, as a result, it has been found that, in a depolymerization reaction of polycarbonate due to an amine compound, the amine compound acts on the carbonate bond of polycarbonate to form a carbamate oligomer as an intermediate, whereupon depolymerization proceeds. Based on this finding, in order to suppress the reaction of an amine compound to the carbonate bond, the main constituent units are formed from the constituent units (B) represented by the formula (2) above, and, as a result, it has been found that the substituent for an aromatic ring has a role of steric hindrance with respect to the carbonate bond.

Further, it has been found that, by virtue of having the constituent units (A) represented by the formula (1) above, the constituent units (B) represented by the formula (2) above, and the constituent units (C) represented by the formula (3) above in a specific ratio, the polycarbonate resin of the invention achieves excellent balance between the scratch resistance, the impact resistance, and the heat resistance while maintaining the amine resistance.

The polycarbonate resin of the invention preferably has a glass transition temperature of 140 to 160° C., more preferably 140 to 155° C., further preferably 140 to 150° C. When the glass transition temperature is 140° C. or higher, a satisfactory heat resistance is obtained, and, when the glass transition temperature is 160° C. or lower, there is no need to increase the molding processing temperature, facilitating the molding.

The polycarbonate resin of the invention preferably has a Rockwell hardness of 95 or more, as measured in accordance with JIS K7202-2 on the M scale. When the Rockwell hardness is 95 or more, excellent scratch resistance is advantageously obtained. When the upper limit of the Rockwell hardness is 120 or less, the polycarbonate resin has satisfactory properties.

The polycarbonate resin of the invention preferably has a striking energy of 25 J or more, more preferably 30 J or more, as measured by a high-velocity surface impact test in accordance with JIS K7211-2. Further, it is preferred that the fracture type is a ductile fracture. When the striking energy is 25 J or more, a brittle fracture is not caused and excellent impact resistance is advantageously obtained. A striking energy of 50 J or less is satisfactory.

The polycarbonate resin of the invention preferably has a pencil hardness of F to 2H, as measured in accordance with Testing methods for paints—Part 5: Mechanical property of film—Section 4: Scratch hardness (Pencil method), which is descried in JIS K5600-5-4. When the pencil hardness is F or more, it is advantageously unlikely that a scratch mark is caused in the surface of the resultant molded article. A pencil hardness of 2H or less is satisfactory.

A molded article of the polycarbonate resin of the invention is prepared, and a soft urethane foam, which is used in a seat cushioning, is cut into a form having a length and a width each of 50 mm and a thickness of 5 mm, and the cut foam and the molded article of the polycarbonate resin are placed in a glass closed vessel and the vessel is sealed, and allowed to stand in a hot-air dryer set at 85° C. for 1,000 hours, and it is preferred that the resultant test specimen has no change in the external appearance.

<Amine Compound Used in Forming a Polyurethane Foam>

A polyurethane resin is generally produced by reacting polyol and polyisocyanate with each other in the presence of a catalyst and, if necessary, a foaming agent, a surfactant, a flame retardant, a crosslinking agent, or the like. It has been known that a number of metal compounds or tertiary amine compounds are used as a catalyst in the production of a polyurethane resin. These catalysts are industrially widely used individually or in combination. In the production of a polyurethane foam using water, a low boiling-point organic compound, or both of them as a foaming agent, in view of excellent productivity and moldability, among these catalysts, especially a tertiary amine compound is widely used. Examples of such tertiary amine compounds include conventionally known triethylenediamine, N,N,N',N'-tetramethylhexanediamine, N,N,N',N'-tetramethylpropanediamine, N,N,N',N'-tetramethylethylenediamine, bis(2-dimethylaminoethyl) ether, N,N,N',N'',N''-pentamethyldiethylenetriamine, N,N',N'-trimethylaminoethylpiperazine, N,N-dimethylbenzylamine, N-methylmorpholine, N-ethylmorpholine, and N,N-dimethylethanolamine.

<Polycarbonate Resin Molded Article, Interior Automotive Trim Part>

From the polycarbonate resin of the invention, an intended molded article can be obtained by a method, such as injection molding, injection compression molding, injection blow molding, two-color molding, extrusion, or blow molding.

With respect to the method for producing the polycarbonate resin of the invention, there is no particular limitation, and, for example, a molded article in a sheet form or in a film form can be obtained by a method, such as a melt extrusion method or a solution casting method (casting method). As a specific method of the melt extrusion method, for example, a system is used in which the polycarbonate resin is fed at a constant rate to an extruder and heat-melted, and the molten resin is extruded into a sheet form on a planished roll from the end portion of a T-die, and drawn by a plurality of rolls while cooling, and, at a time when the sheet is solidified, the sheet is cut into an appropriate size or wound. As a specific method of the solution casting method, for example, a system is used in which a solution (concentration: 5 to 40%) obtained by dissolving the polycarbonate resin in methylene chloride is cast on a mirror-polished stainless steel plate from a T-die, and the resultant sheet is peeled while being passed through an oven which is step-wise controlled in temperature, and the solvent is removed from the sheet, followed by cooling and winding.

The polycarbonate resin can be in the form of a laminate. As a method for producing a laminate, an arbitrary method may be used, and, particularly, a hot pressing method or a co-extrusion method is preferably performed. As a hot pressing method, an arbitrary method is employed, and, for example, a method in which a polycarbonate resin sheet is subjected to hot pressing by a laminating machine or a pressing machine, or a method in which, immediately after being extruded, a polycarbonate resin sheet is subjected to hot pressing is preferred, and particularly, a method in which, immediately after being extruded, a polycarbonate resin sheet is continuously subjected to hot pressing is advantageous from a commercial point of view.

Further, the polycarbonate resin of the invention has excellent scratch resistance, impact resistance, and amine resistance, and therefore is used as an interior automotive trim part. Examples of interior automotive trim parts include a lamp lens for room lighting, a meter cover for display, a meter number plate, various switch covers, a display cover, a heat control panel, an instrument panel, a center cluster, a center panel, a room lamp lens, various types of display devices, such as a headup display, protective parts, and translucent parts. Further, the interior automotive trim part of the invention has the above-mentioned properties and hence requires no coating treatment, and has an advantage in that the polycarbonate resin molded article can be used as such.

EXAMPLES

Hereinbelow, the present invention will be described in more detail with reference to the following Examples, which should not be construed as limiting the scope of the invention. In the following Examples and Comparative Examples, the methods for measuring the properties are as shown below.

(1) Viscosity Average Molecular Weight

A viscosity average molecular weight of a polycarbonate resin composition was measured and calculated by the method shown below.

The polycarbonate resin composition pellets obtained by extrusion were first mixed with and dissolved in methylene chloride having a weight 30 times the weight of the pellets, and the soluble material was taken by Celite filtration. Then, the solvent was removed from the resultant solution, and then the obtained solid was satisfactorily dried, and 0.7 g of the solid was dissolved in 100 ml of methylene chloride to obtain a solution, and a specific viscosity ($\eta_{sp}$) of the solution at 20° C. was measured. My calculated from the following formula was determined as a viscosity average molecular weight.

$\eta_{sp}/c = [1] + 0.45 \times [\eta]^2 c$ $[\eta] = 1.23 \times 10^{-4} Mv^{0.83}$ $\eta_{sp}$: Specific viscosity $\eta$: Intrinsic viscosity c: Constant (=0.7)

Mv: Viscosity average molecular weight (2) Ratio for Composition 40 mg of a polycarbonate resin was dissolved in 0.6 ml of deuterated chloroform solution, and subjected to $^1$H-NMR measurement by means of a 400 MHz nuclear magnetic resonance apparatus, manufactured by JEOL LTD., and, from the ratio of the peak areas in a spectrum characteristic of the respective constituent units, a ratio for the composition of the polycarbonate resin was determined by calculation.

(3) Glass Transition Temperature

Using thermal analysis system DSC-2910, manufactured by TA Instruments, a glass transition temperature was measured in accordance with JIS K7121 in a nitrogen gas atmosphere (nitrogen gas flow rate: 40 ml/min) under conditions such that the temperature increase rate was 20° C./min.

(4) High-Velocity Surface Impact Test

Using Shimadzu Hydroshot HTM-1 at a test speed of 7 m/second and an impactor radius of 6.4 mm, with respect to a three-step shaped plate obtained in connection with the measurement of a pencil hardness, a striking energy was measured at a portion of the plate having a thickness of 2 mm, and the resultant plate was visually observed in respect of the fracture type.

(5) Indentation Hardness (Rockwell Hardness)

A test was conducted in accordance with JIS K7202-2 on the M scale. As a test specimen, a flat plate having a length and a width each of 100 mm and a thickness of 8 mm was used.

(6) Pencil Hardness

Using a mold having a cavity surface having an arithmetic mean roughness (Ra) of 0.03 m, and using injection molding machine J-75E3, manufactured by The Japan Steel Works, Ltd., a three-step shaped plate was molded under conditions such that the cylinder temperature was 280° C. and the mold temperature was 80° C. for a pressure dwell time of 20 seconds and a cooling time of 20 seconds, wherein the three-step shaped plate has a width of 50 mm, a length of 90 mm, and thicknesses of 3 mm (length: 20 mm), 2 mm (length: 45 mm), and 1 mm (length: 25 mm) as viewed from the gate side. With respect to the three-step shaped plate, a pencil hardness was measured at a portion of the plate having a thickness of 2 mm in accordance with JIS K5600.

(7) Evaluation of Amine Resistance

Using a mold having a cavity surface having an arithmetic mean roughness (Ra) of 0.03 m, and using injection molding machine J-75E3, manufactured by The Japan Steel Works, Ltd., a three-step shaped plate was molded under conditions such that the cylinder temperature was 290° C. and the mold temperature was 80° C. for a pressure dwell time of 20 seconds and a cooling time of 20 seconds, wherein the three-step shaped plate has a width of 50 mm, a length of 90 mm, and thicknesses of 3 mm (length: 20 mm), 2 mm (length: 45 mm), and 1 mm (length: 25 mm) as viewed from the gate side. A soft urethane foam, which is used in an automobile seat cushioning, was cut using a cutter into a form having a length and a width each of 50 mm and a thickness of 5 mm, and the cut foam and the three-step shaped plate were placed in a glass closed vessel and the vessel was sealed, and allowed to stand in a hot-air dryer set at 85° C. for 1,000 hours, and then the resultant test specimen was visually observed in respect of the external appearance.

Example 1

Into a reactor equipped with a thermometer, a stirrer, and a reflux condenser were charged 4,555 parts of a 48% aqueous solution of sodium hydroxide and 22,730 parts of ion-exchanged water, and in the resultant mixture were dissolved 596 parts of 9,9-bis(4-hydroxyphenyl)fluorene (manufactured by Honshu Chemical Industry Co., Ltd.), 1,213 parts of bisphenol C (manufactured by Honshu Chemical Industry Co., Ltd.), 2,159 parts of bisphenol A (manufactured by Nippon Steel Chemical Group), and 7.94 parts of hydrosulfite (manufactured by Wako Pure Chemical Industries, Ltd.), and then 13,415 parts of methylene chloride was added to the resultant solution, and, while stirring, 2,000 parts of phosgene was blown into the solution at 15 to 25° C. over about 70 minutes. After completion of blowing phosgene, 650 parts of a 48% aqueous solution of sodium hydroxide and 89.9 parts of p-tert-butylphenol were added, and the resultant mixture was stirred and emulsified, and then 3.94 parts of triethylamine was added and the resultant mixture was further stirred at 28 to 35° C. for one hour, terminating the reaction.

After completion of the reaction, the resultant product was diluted with methylene chloride and washed with water and then, hydrochloric acid was added so that the resultant solution became acidic, and the solution was washed with water, and further repeatedly washed with water until the electrical conductivity of the aqueous phase became almost equivalent to that of ion-exchanged water, obtaining a methylene chloride solution of a polycarbonate resin. Then, the obtained solution was passed through a filter having a sieve opening of 0.3 m, and further dropwise added to warm water in a kneader with an isolated chamber having a foreign matter withdrawal outlet in a bearing portion, and flakes of the polycarbonate resin were formed while distilling off methylene chloride, and subsequently the resultant liquid-containing flakes were pulverized and dried to obtain a powder.

Then, to 100 parts by weight of the above-obtained powder were added 0.05 part by weight of IRGAFOS 168 (manufactured by Ciba Specialty Chemicals Inc.), 0.1 part by weight of S-100A (manufactured by Riken Vitamin Co., Ltd.), and 0.3 part of KEMISORB 79 (manufactured by Chemipro Kasei Kaisha, Ltd.), and the resultant powder was uniformly mixed, and then subjected to melt-kneading extrusion by means of a vented twin-screw extruder [KTX-46, manufactured by Kobe Steel Ltd.] while deaerating to obtain polycarbonate resin composition pellets. Using the obtained pellets, the evaluations were individually made, and the results of the evaluations were shown in Table 1.

Example 2

Polycarbonate resin composition pellets were obtained in accordance with substantially the same procedure as in Example 1 except that 1, 618 parts of bisphenol C (manufactured by Honshu Chemical Industry Co., Ltd.), 1,799 parts of bisphenol A (manufactured by Nippon Steel Chemical Group), and 87.6 parts of p-tert-butylphenol were used. The results of the evaluations made using the obtained pellets were shown in Table 1.

Example 3

Polycarbonate resin composition pellets were obtained in accordance with substantially the same procedure as in Example 1 except that 2,023 parts of bisphenol C (manufactured by Honshu Chemical Industry Co., Ltd.), 1,440 parts of bisphenol A (manufactured by Nippon Steel Chemical Group), and 82.8 parts of p-tert-butylphenol were used. The results of the evaluations made using the obtained pellets were shown in Table 1.

Example 4

Polycarbonate resin composition pellets were obtained in accordance with substantially the same procedure as in Example 1 except that 298 parts of 9,9-bis(4-hydroxyphenyl)fluorene (manufactured by Honshu Chemical Industry Co., Ltd.), 1,820 parts of bisphenol C (manufactured by Honshu Chemical Industry Co., Ltd.), 1,799 parts of bisphenol A (manufactured by Nippon Steel Chemical Group), and 71.0 parts of p-tert-butylphenol were used. The results of the evaluations made using the obtained pellets were shown in Table 1.

Example 5

Polycarbonate resin composition pellets were obtained in accordance with substantially the same procedure as in Example 1 except that 894 parts of 9,9-bis(4-hydroxyphenyl)fluorene (manufactured by Honshu Chemical Industry Co., Ltd.), 1,213 parts of bisphenol C (manufactured by Honshu Chemical Industry Co., Ltd.), 1,979 parts of bisphenol A (manufactured by Nippon Steel Chemical Group), and 106.5 parts of p-tert-butylphenol were used. The results of the evaluations made using the obtained pellets were shown in Table 1.

Example 6

Into a reactor equipped with a thermometer, a stirrer, and a reflux condenser were charged 4,555 parts of a 48% aqueous solution of sodium hydroxide and 22,730 parts of ion-exchanged water, and in the resultant mixture were dissolved 2,023 parts of bisphenol C (manufactured by Honshu Chemical Industry Co., Ltd.), 1,799 parts of bisphenol A (manufactured by Nippon Steel Chemical Group), and 7.94 parts of hydrosulfite (manufactured by Wako Pure Chemical Industries, Ltd.), and then 13,415 parts of methylene chloride was added to the resultant solution, and, while stirring, 2,000 parts of phosgene was blown into the solution at 15 to 25° C. over about 70 minutes. After completion of blowing phosgene, 650 parts of a 48% aqueous solution of sodium hydroxide and 89.9 parts of p-tert-butylphenol were added, and the resultant mixture was stirred and emulsified, and then 3.94 parts of triethylamine was added and the resultant mixture was further stirred at 28 to 35° C. for one hour, terminating the reaction.

After completion of the reaction, the resultant product was diluted with methylene chloride and washed with water and then, hydrochloric acid was added so that the resultant solution became acidic, and the solution was washed with water, and further repeatedly washed with water until the electrical conductivity of the aqueous phase became almost equivalent to that of ion-exchanged water, obtaining a methylene chloride solution of a polycarbonate resin. Then, the obtained solution was passed through a filter having a sieve opening of 0.3 μm, and further dropwise added to warm water in a kneader with an isolated chamber having a foreign matter withdrawal outlet in a bearing portion, and flakes of the polycarbonate resin were formed while distilling off methylene chloride, and subsequently the resultant liquid-containing flakes were pulverized and dried to obtain a powder (A).

Into a reactor equipped with a thermometer, a stirrer, and a reflux condenser were charged 4,936 parts of a 48% aqueous solution of sodium hydroxide and 21,550 parts of ion-exchanged water, and in the resultant mixture were dissolved 1,696 parts of 9,9-bis(4-hydroxyphenyl)fluorene (manufactured by Honshu Chemical Industry Co., Ltd.), 2,388 parts of bisphenol A (manufactured by Nippon Steel Chemical Group), and 8.17 parts of hydrosulfite (manufactured by Wako Pure Chemical Industries, Ltd.), and then 19,080 parts of methylene chloride was added to the resultant solution, and, while stirring, 2,000 parts of phosgene was blown into the solution at 15 to 25° C. over about 70 minutes. After completion of blowing phosgene, 617 parts of a 48% aqueous solution of sodium hydroxide and 85.3 parts of p-tert-butylphenol were added, and the resultant mixture was stirred and emulsified, and then 3.94 parts of triethylamine was added and the resultant mixture was further stirred at 28 to 35° C. for one hour, terminating the reaction.

After completion of the reaction, the resultant product was diluted with methylene chloride and washed with water and then, hydrochloric acid was added so that the resultant solution became acidic, and the solution was washed with water, and further repeatedly washed with water until the electrical conductivity of the aqueous phase became almost equivalent to that of ion-exchanged water, obtaining a methylene chloride solution of a polycarbonate resin. Then, the obtained solution was passed through a filter having a sieve opening of 0.3 µm, and further dropwise added to warm water in a kneader with an isolated chamber having a foreign matter withdrawal outlet in a bearing portion, and flakes of the polycarbonate resin were formed while distilling off methylene chloride, and subsequently the resultant liquid-containing flakes were pulverized and dried to obtain a powder (B).

70 Parts by weight of the powder (A), 30 parts by weight of the powder (B), 0.05 part by weight of IRGAFOS 168 (manufactured by Ciba Specialty Chemicals Inc.), 0.1 part by weight of S-100A (manufactured by Riken Vitamin Co., Ltd.), and 0.3 part of KEMISORB 79 (manufactured by Chemipro Kasei Kaisha, Ltd.) were added, and the resultant powder was uniformly mixed, and then subjected to melt-kneading extrusion by means of a vented twin-screw extruder [KTX-46, manufactured by Kobe Steel Ltd.] while deaerating to obtain polycarbonate resin composition pellets. Using the obtained pellets, the evaluations were individually made, and the results of the evaluations were shown in Table 1.

Example 7

Polycarbonate resin composition pellets were obtained in accordance with substantially the same procedure as in Example 1 except that 596 parts of 9,9-bis(4-hydroxyphenyl)fluorene (manufactured by Honshu Chemical Industry Co., Ltd.), 2,225 parts of bisphenol C (manufactured by Honshu Chemical Industry Co., Ltd.), 1,259 parts of bisphenol A (manufactured by Nippon Steel Chemical Group), and 88.7 parts of p-tert-butylphenol were used. The results of the evaluations made using the obtained pellets were shown in Table 1.

Comparative Example 1

Polycarbonate resin composition pellets were obtained in accordance with substantially the same procedure as in Example 1 except that 179 parts of 9,9-bis(4-hydroxyphenyl)fluorene (manufactured by Honshu Chemical Industry Co., Ltd.), 2,023 parts of bisphenol C (manufactured by Honshu Chemical Industry Co., Ltd.), 1,691 parts of bisphenol A (manufactured by Nippon Steel Chemical Group), and 92.3 parts of p-tert-butylphenol were used. The results of the evaluations made using the obtained pellets were shown in Table 2.

Comparative Example 2

Polycarbonate resin composition pellets were obtained in accordance with substantially the same procedure as in Example 1 except that 1,193 parts of 9,9-bis(4-hydroxyphenyl)fluorene (manufactured by Honshu Chemical Industry Co., Ltd.), 1,618 parts of bisphenol C (manufactured by Honshu Chemical Industry Co., Ltd.), 1,439 parts of bisphenol A (manufactured by Nippon Steel Chemical Group), and 92.3 parts of p-tert-butylphenol were used. The results of the evaluations made using the obtained pellets were shown in Table 2.

Comparative Example 3

Polycarbonate resin composition pellets were obtained in accordance with substantially the same procedure as in Example 1 except that bisphenol A was not used, and 566 parts of 9,9-bis(4-hydroxyphenyl)fluorene (manufactured by Honshu Chemical Industry Co., Ltd.), 3,452 parts of bisphenol C (manufactured by Honshu Chemical Industry Co., Ltd.), and 80.1 parts of p-tert-butylphenol were used. The results of the evaluations made using the obtained pellets were shown in Table 2.

Comparative Example 4

Polycarbonate resin composition pellets were obtained in accordance with substantially the same procedure as in Example 1 except that bisphenol C was not used, and 596 parts of 9,9-bis(4-hydroxyphenyl)fluorene (manufactured by Honshu Chemical Industry Co., Ltd.), 3,238 parts of bisphenol A (manufactured by Nippon Steel Chemical Group), and 71.0 parts of p-tert-butylphenol were used. The results of the evaluations made using the obtained pellets were shown in Table 2.

Comparative Example 5

Polycarbonate resin composition pellets were obtained in accordance with substantially the same procedure as in Example 1 except that 9,9-bis(4-hydroxyphenyl)fluorene (manufactured by Honshu Chemical Industry Co., Ltd.) was not used, and 2,023 parts of bisphenol C (manufactured by Honshu Chemical Industry Co., Ltd.), 1,799 parts of bisphenol A (manufactured by Nippon Steel Chemical Group), and 87.6 parts of p-tert-butylphenol were used. The results of the evaluations made using the obtained pellets were shown in Table 2.

Comparative Example 6

Polycarbonate resin Panlite L-1225L, manufactured by Teijin Chemicals Ltd., was used. The results of the evaluations made using the polycarbonate resin were shown in Table 2.

Comparative Example 7

Into a reactor equipped with a thermometer, a stirrer, and a reflux condenser were charged 5,126 parts of a 48% aqueous solution of sodium hydroxide and 22,377 parts of ion-exchanged water, and in the resultant mixture were dissolved 2,349 parts of 9,9-bis(4-hydroxyphenyl)fluorene (manufactured by Honshu Chemical Industry Co., Ltd.), 2,125 parts of bisphenol A (manufactured by Nippon Steel Chemical Group), and 8.95 parts of hydrosulfite (manufactured by Wako Pure Chemical Industries, Ltd.), and then 13,209 parts of methylene chloride was added to the resultant solution, and, while stirring, 2,000 parts of phosgene was blown into the solution at 15 to 25° C. over about 70 minutes. After completion of blowing phosgene, 640 parts of a 48% aqueous solution of sodium hydroxide and 116.6 parts of p-tert-butylphenol were added, and the resultant mixture was stirred and emulsified, and then 3.94 parts of triethylamine was added and the resultant mixture was further stirred at 28 to 35° C. for one hour, terminating the reaction.

After completion of the reaction, the resultant product was diluted with methylene chloride and washed with water and then, hydrochloric acid was added so that the resultant solution became acidic, and the solution was washed with water, and further repeatedly washed with water until the electrical conductivity of the aqueous phase became almost equivalent to that of ion-exchanged water, obtaining a methylene chloride solution of a polycarbonate resin. Then, the obtained solution was passed through a filter having a sieve opening of 0.3 μm, and further dropwise added to warm water in a kneader with an isolated chamber having a foreign matter withdrawal outlet in a bearing portion, and flakes of the polycarbonate resin were formed while distilling off methylene chloride, and subsequently the resultant liquid-containing flakes were pulverized and dried to obtain a powder.

Then, to 100 parts by weight of the above-obtained powder were added 0.05 part by weight of IRGAFOS 168 (manufactured by Ciba Specialty Chemicals Inc.), 0.1 part by weight of S-100A (manufactured by Riken Vitamin Co., Ltd.), and 0.3 part of KEMISORB 79 (manufactured by Chemipro Kasei Kaisha, Ltd.), and the resultant powder was uniformly mixed, and then subjected to melt-kneading extrusion by means of a vented twin-screw extruder [KTX-46, manufactured by Kobe Steel Ltd.] while deaerating to obtain polycarbonate resin composition pellets. Using the obtained pellets, the evaluations were individually made, and the results of the evaluations were shown in Table 2.

Comparative Example 8

Into a reactor equipped with a stirrer and a distillation column were charged 56.3 parts (0.22 mol) of 2,2-bis(4-hydroxy-3-methylphenyl)propane, 49.2 parts (0.23 mol) of diphenyl carbonate, and, as a catalyst, 0.000005 part of sodium hydroxide and 0.0016 part of tetramethylammonium hydroxide, and the reactor was purged with nitrogen gas. The resultant mixture was dissolved while heating to 180° C. Then, the stirrer was operated and the temperature in the reactor was maintained at 220° C. While distilling off the by-produced phenol, the pressure in the reactor was reduced from 101.3 kPa to 13.3 kPa over 40 minutes. Subsequently, while maintaining the pressure in the reactor at 13.3 kPa and further distilling off phenol, a transesterification reaction was conducted for 80 minutes.

The internal pressure was reduced from 13.3 kPa to 2 kPa in terms of the absolute pressure, and further the temperature was increased to 260° C. to remove the distilled phenol from the system. The temperature elevation was further continued, and, after the pressure in the reactor reached 0.3 Pa or less, the internal pressure was maintained and a polycondensation reaction was performed. The final inner temperature of the reactor was 295° C. At a point in time when the stirrer of the reactor had the predetermined stirring power, the polycondensation reaction was terminated. The polymerization reaction time for the reactor was 140 minutes. Then, to the resultant mixture as in the molten state was added 0.0023 part ($4\times10^{-5}$ mol/bisphenol 1 mol) of tetrabutylphosphonium dodecylbenzenesulfonate as a catalyst neutralizing agent, and a reaction was continued at 295° C. under 10 Torr or less for 10 minutes, and the resultant polymer was fed using a gear pump to a vented twin-screw extruder [KTX-46, manufactured by Kobe Steel Ltd.]. Tris (2,4-di-tert-butylphenyl) phosphite and phosphorous acid were added to the polymer in the extruder, and the resultant mixture was subjected to melt-kneading extrusion at an inlet barrel temperature of 230° C., an outlet barrel temperature of 270° C., and a polycarbonate resin outlet temperature of 285° C. while deaerating, and extruded from the outlet of the twin-screw extruder into a strand form, and cooled and solidified using water, followed by pelletization using a rotary cutter, to obtain polycarbonate resin pellets. The results of the evaluations made using the obtained pellets were shown in Table 2.

Comparative Example 9

A procedure was performed in the same manner as described in Example 6, and 90 parts by weight of the powder (A), 10 parts by weight of the powder (B), 0.05 part by weight of IRGAFOS 168 (manufactured by Ciba Specialty Chemicals Inc.), 0.1 part by weight of S-100A (manufactured by Riken Vitamin Co., Ltd.), and 0.3 part of KEMISORB 79 (manufactured by Chemipro Kasei Kaisha, Ltd.) were added, and the resultant powder was uniformly mixed, and then subjected to melt-kneading extrusion by means of a vented twin-screw extruder [KTX-46, manufactured by Kobe Steel Ltd.] while deaerating to obtain polycarbonate resin composition pellets. Using the obtained pellets, the evaluations were individually made, and the results of the evaluations were shown in Table 2.

TABLE 1

|  | Unit | Example 1 | Example 2 | Example 3 | Example 4 | Example 5 | Example 6 | Example 7 |
|---|---|---|---|---|---|---|---|---|
| Dihydric phenol deriving constituent units (A) | — | BCF | BCF | BCF | BCF | BCF | BCF | BCF |
| Dihydric phenol deriving constituent units (B) | — | BPC | BPC | BPC | BPC | BPC | BPC | BPC |
| Dihydric phenol deriving constituent units (C) | — | BPA | BPA | BPA | BPA | BPA | BPA | BPA |
| Composition Ratio: (A)/(B)/(C) | mol % | 10/30/60 | 10/40/50 | 10/50/40 | 5/45/50 | 15/30/55 | 8/37/55 | 10/55/35 |
| Viscosity average molecular weight | — | 18,200 | 20,300 | 22,700 | 26,400 | 16,500 | 21,300 | 20,600 |
| Glass transition temperature | ° C. | 150 | 144 | 143 | 141 | 155 | 146 | 140 |
| Fracture type | — | Ductile | Ductile | Ductile | Ductile | Ductile | Ductile | Ductile |
| Striking energy | J | 35 | 30 | 27 | 32 | 35 | 30 | 30 |
| Rockwell hardness | — | 95 | 99 | 102 | 96 | 96 | 95 | 105 |
| Pencil hardness | — | H | 2H | 2H | H | H | H | 2H |
| Amine resistance | — | No change | No change | No change | No change | No change | No change | No change |

TABLE 2

| | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Dihydric phenol deriving constituent units (A) | — | BCF | BCF | BCF | BCF | — | — | BCF | — | BCF |
| Dihydric phenol deriving constituent units (B) | — | BPC | BPC | BPC | — | BPC | — | — | BPC | BPC |
| Dihydric phenol deriving constituent units (C) | — | BPA | BPA | — | BPA | BPA | BPA | BPA | — | BPA |
| Composition Ratio: (A)/(B)/(C) | mol % | 3/50/47 | 20/40/40 | 10/90/0 | 10/0/90 | 0/50/50 | 0/0/100 | 40/0/60 | 0/100/0 | 3/45/52 |
| Viscosity average molecular weight | — | 20,500 | 20,300 | 22,700 | 26,400 | 21,500 | 19,800 | 14,500 | 27,100 | 21,500 |
| Glass transition temperature | ° C. | 138 | 158 | 133 | 160 | 131 | 148 | 188 | 121 | 140 |
| Fracture type | — | Ductile | Brittle | Brittle | Ductile | Ductile | Ductile | Brittle | Brittle | Ductile |
| Striking energy | J | 27 | <1 | <1 | 36 | 32 | 40 | <1 | <1 | 33 |
| Rockwell hardness | — | 93 | 96 | 102 | 72 | 88 | 68 | 88 | 102 | 67 |
| Pencil hardness | — | F | 2H | 2H | B | F | 2B | F | 2H | F |
| Amine resistance | — | No change | No change | No change | Surface whitening | No change | Surface whitening | Surface whitening | No change | Surface whitening |

INDUSTRIAL APPLICABILITY

The polycarbonate resin of the present invention requires no coating treatment, and can be used in interior automotive trim parts, such as a lamp lens for room lighting, a meter cover for display, a meter number plate, various switch covers, a display cover, a heat control panel, an instrument panel, a center cluster, a center panel, a room lamp lens, various types of display devices, e.g., a headsup display, protective parts, and translucent parts.

The invention claimed is:

1. A polycarbonate copolymer or copolymerized polycarbonate blend having excellent amine resistance, comprising, as main constituent units, (A) constituent units each represented by the following formula (1):

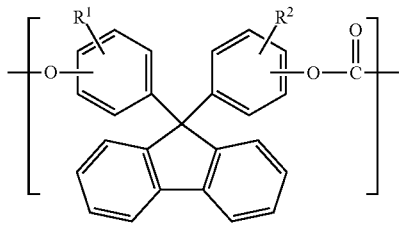

(1)

wherein, in the formula (1), each of $R^1$ and $R^2$ is independently a hydrogen atom, a hydrocarbon group having 1 to 9 carbon atoms and optionally containing an aromatic group, or a halogen atom, (B) constituent units each represented by the following formula (2):

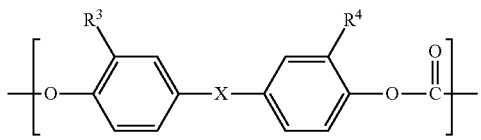

(2)

wherein, in the formula (2), each of $R^3$ and $R^4$ is independently an alkyl group having 1 to 6 carbon atoms or a halogen atom, and X is a single bond, a substituted or unsubstituted alkylene group, a substituted or unsubstituted alkylidene group, a sulfur atom, or an oxygen atom, and (C) constituent units each represented by the following formula (3):

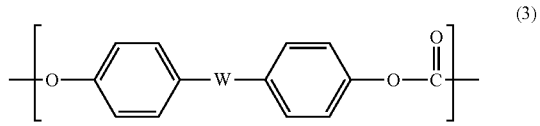

(3)

wherein, in the formula (3), W represents a single bond, a substituted or unsubstituted alkylene group, a substituted or unsubstituted alkylidene group, a sulfur atom, or an oxygen atom, wherein the amount of the constituent units (A) is 5 to 15 mol %, the amount of the constituent units (B) is 20 to 60 mol %, and the amount of the constituent units (C) is 25 to 75 mol %, based on the mole of the all constituent units.

2. The polycarbonate copolymer or copolymerized polycarbonate blend having excellent amine resistance according to claim 1, wherein each of $R^1$ and $R^2$ in the formula (1) is independently a hydrogen atom or an alkyl group having 1 to 6 carbon atoms, and, in the formula (2), each of $R^3$ and $R^4$ is independently an alkyl group having 1 to 6 carbon atoms, and X is a single bond, a substituted or unsubstituted alkylene group having 1 to 10 carbon atoms, or a substituted or unsubstituted alkylidene group having 1 to 10 carbon atoms, and W in the formula (3) is a single bond, a substituted or unsubstituted alkylene group having 1 to 10 carbon atoms, or a substituted or unsubstituted alkylidene group having 1 to 10 carbon atoms.

3. The polycarbonate copolymer or copolymerized polycarbonate blend according to claim 1, which has a glass transition temperature of 140 to 160° C.

4. The polycarbonate copolymer or copolymerized polycarbonate blend according to claim 1, which has a Rockwell hardness of 95 to 120, as measured by means of a Rockwell hardness tester (M scale) in accordance with JIS K7202-2.

5. The polycarbonate copolymer or copolymerized polycarbonate blend according to claim 1, which has a striking energy of 25 J or more, as measured by a high-velocity surface impact test in accordance with JIS K7211-2, wherein the fracture type is a ductile fracture.

6. The polycarbonate copolymer or copolymerized polycarbonate blend according to claim 1, which has a viscosity average molecular weight of 15,000 to 40,000.

7. The polycarbonate copolymer or copolymerized polycarbonate blend according to claim 1, wherein the constituent units (A) are constituent units derived from 9,9-bis(4-hydroxy-3-methylphenyl)fluorene.

8. The polycarbonate copolymer or copolymerized polycarbonate blend according to claim 1, wherein the constituent units (B) are constituent units derived from 2,2-bis(4-hydroxy-3-methylphenyl)propane.

9. The polycarbonate copolymer or copolymerized polycarbonate blend according to claim 1, wherein the constituent units (C) are constituent units derived from 2,2-bis(4-hydroxyphenyl)propane.

10. A molded article which is obtained by subjecting the polycarbonate copolymer or copolymerized polycarbonate blend according to claim 1 to injection molding.

11. A sheet or film which is obtained by subjecting the polycarbonate copolymer or copolymerized polycarbonate blend according to claim 1 to extrusion.

12. An interior automotive trim part using the molded article of claim 10.

* * * * *